(12) United States Patent
Rodriguez-Cruz

(10) Patent No.: US 12,145,555 B2
(45) Date of Patent: Nov. 19, 2024

(54) WHEEL CHOCK ASSEMBLY

(71) Applicant: Angel Rodriguez-Cruz, The Villages, FL (US)

(72) Inventor: Angel Rodriguez-Cruz, The Villages, FL (US)

(*) Notice: Subject to any disclaimer, the term of this patent is extended or adjusted under 35 U.S.C. 154(b) by 983 days.

(21) Appl. No.: 16/974,125

(22) Filed: Oct. 14, 2020

(65) Prior Publication Data

US 2021/0213915 A1 Jul. 15, 2021

Related U.S. Application Data

(63) Continuation-in-part of application No. 15/530,922, filed on Mar. 24, 2017, now abandoned.

(51) Int. Cl.
*B60T 3/00* (2006.01)
*B60P 3/077* (2006.01)
*B66F 3/08* (2006.01)

(52) U.S. Cl.
CPC ..................... *B60T 3/00* (2013.01)

(58) Field of Classification Search
CPC .... B60T 3/00; B60R 11/06; B66F 3/08; B60P 3/077
USPC ...................... 188/4 R, 32; 410/30
See application file for complete search history.

(56) References Cited

U.S. PATENT DOCUMENTS

| | | | | |
|---|---|---|---|---|
| 3,539,037 A * | 11/1970 | Brown | ....................... | B60T 3/00 188/32 |
| 5,392,880 A * | 2/1995 | Christian | .................. | B60T 3/00 188/32 |
| 5,769,186 A * | 6/1998 | Roberts | ..................... | B60T 3/00 188/32 |
| 6,425,465 B1 * | 7/2002 | Tallman | .................. | B60P 3/075 188/32 |

* cited by examiner

*Primary Examiner* — Daniel J Colilla

(57) ABSTRACT

PROPCA is a multi-purpose tool composed of two chocks joined by groove and protrusion. Installing the handle (bolt and spike) through the bottom of PROPCA could be used to remove dirt or snow, separate, each can perform various tasks due to particular form and drill holes in specific areas. The reduction in size allows the creation of different and more manageable tools, with better efficiency helping each other in the accomplishment of different task. To separate PROPCA, the spike and bolt should be removed and both chocks slide apart. That single chock could be used as a jack, hammer, nail remover, scraper, pickaxe, or as a tire catapult or tire restrainer. Both chocks could work together to remove the rim from the flat tire. Ordinary vehicle tools are limited in performance. A multi-purpose tools could be the difference when physical integrity is at risk.

12 Claims, 25 Drawing Sheets

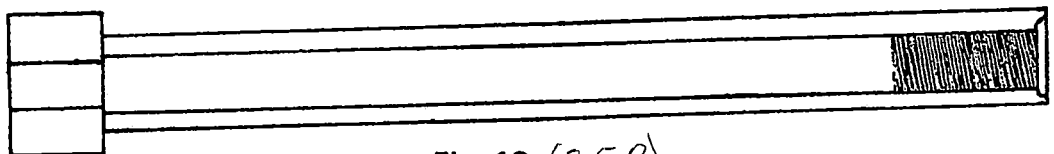
Fig. 12 (25A)
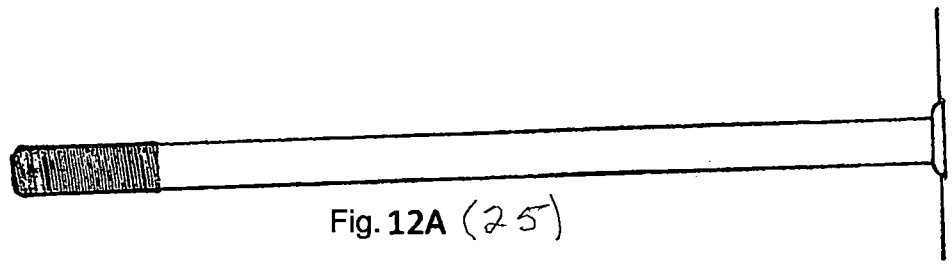
Fig. 12A (25)

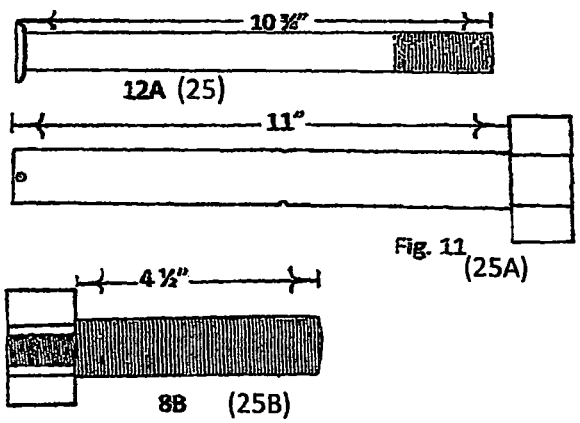
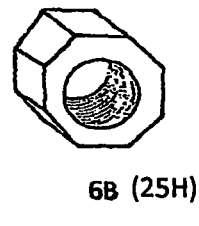
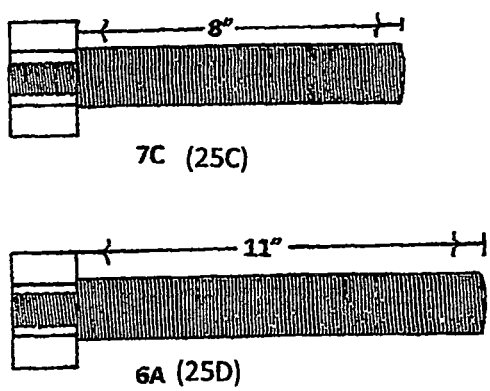
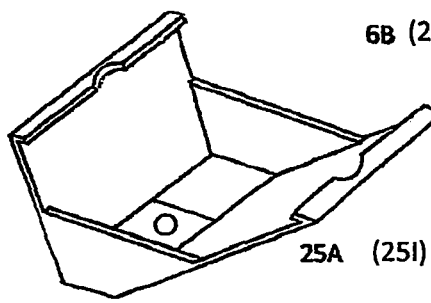
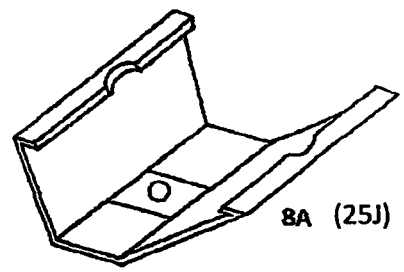
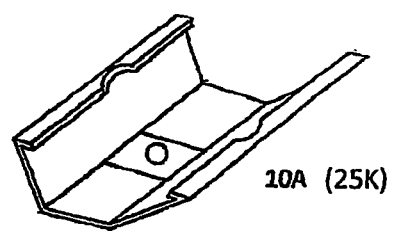
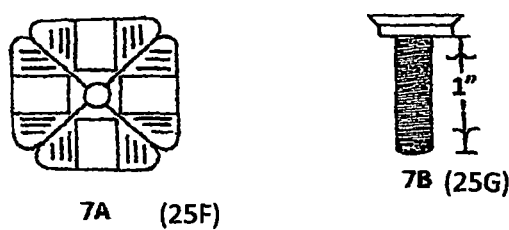
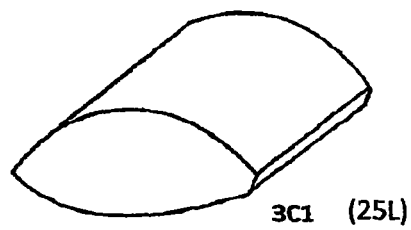
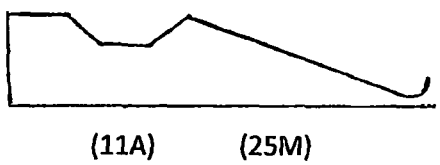
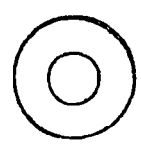
FIG. 25

WHEEL CHOCK ASSEMBLY

It consists, as a whole of two chocks joined by a protrusion and a groove, measuring 5" height×10" long×10" width. Is a tool that provides, in an expeditious way, the disposition of several tools. It can be located in the trunk occupying little space, with easy access and the confidence of having a tool that can be used in times of emergency or in various other situations.

CROSS REFERENCE TO RELATED APPLICATIONS (IF ANY) (RELATED APPLICATION MAY BE LISTED ON AN APPLICATION DATA SHEET, EITHER INSTEAD OF OR TOGETHER WITH BEING LISTED IN THE SPECIFICATION)

The present Non-Provisional Application is a continuations in part and claims priority from and the benefit of (Non Provisional Application) PROPCA Ser. No. 15/530,922 filed Mar. 24, 2017. Second prior (Non-Provisional Application) PROPCA (Prop Wedge Assembly) Ser. No. 15/530,922 filed on Jul. 15, 2019 and first-prior PROPCA (Non-Provisional Application) Ser. No. 15/530,922 filed on Feb. 13, 2020 the contents of which are hereby Incorporated by Reference.

STATEMENT OF FEDERALLY SPONSORED RESEARCH OR DEVELOPMENT (IF ANY)

Not applicable

THE NAMES OF THE PARTIES TO A JOINT RESEARCH AGREEMENT IF THE CLAIMED INVENTION WAS MADE AS A RESULT OF ACTIVITIES WITHIN THE SCOPE OF JOINT RESEARCH AGREEMENT

Not applicable

REFERENCE TO A SEQUENCE LISTING, A TABLE, OR A COMPUTER PROGRAM LISTING APPENDIX SUBMITTED ON A COMPACT DISC AND AN INCORPORATION BY REFERENCE OF THE MATERIAL ON THE COMPACT DISC. THE TOTAL NUMBER OF COMPACT DISC INCLUDING DUPLICATES AND THE FILED ON EACH COMPACT DISC SHALL BE SPECIFIED

Not applicable

BACKGROUND OF THE INVENTION

Field of the Invention

The following disclosure relates to two restrictive chocks for tires in general, and particularly is related with two chocks joined by a groove and a protrusion that, when separated, can create two manageable tools to perform different tasks inherent to the maintenance of cars.

Background Art

A wide variety of wedges with different shapes and characteristics can be found on the market. Some of them need to be assembled before use, which requires skill, time and tools. Other simpler wedges, smaller in size, to increase their retention force, attach teeth to the bottom with the intention of fixing it to the ground allowing easy penetration into the soft ground, causing the tire to go over the chock.

Further more, presently used chocks when used on relatively soft surfaces tend to move laterally or skew under the weight of the vehicle.

Other chocks are limited to tandem wheels and require several steps in the assembly process. It would be easier and more efficient to tie both wheels with a chain and padlock.

A further disadvantage of presently used chocks is the difficulty encountered in removing them from their abutting relationship with a wheel of a vehicle especially where the vehicle has moved slightly so that the wheel rests partially on the chock.

Another problem with presently used chocks is storing them within the automobile.

Presently used chocks are voluminous and use up much needed storage space specially in increasing popular small cars where storage space is limited.

The chock with the groove is the smaller one. The chock with lump is the large one. It can be used vertically or horizontally as a chock. If used vertically, a piece of rubber in area 3C will prevent slipping. If it is used horizontally as a jack, the lump will be upright. The height to be reached will be greater, FIG. 10. The use will depend on the space available to locate the chocks. When using the two chocks with the 11" screw, two nuts can be used, one at the top and one in the middle of chocks for added security and stability. The spike should be kept in predetermined location, 6C.

If the tire has to be taken off the rim, the two chocks could work together to do it. One could be placed between the rim and the tire and the other could hit on the back of the chock to take the tire off the rim. A new sheet with drawing explaining how to do it is attached. FIG. 24. The invention has been presented with respect to the more common embodiments and variations. Changes in size and modifications are contemplated by the inventor and he doesn't wish to be limited except by the scope of the appended claims. It is clear that the limited claims submitted could affect the true scope, efficiency and variety in the performance of the invention. We are aware of it. Hoping that the parts, processes, combinations and modifications that are within the structure are partial and useful devices of easy assemble and simple handling.

BRIEF SUMMARY OF THE INVENTION

The primary objective of the current intention is to present a pair of multi-use chocks for motor vehicle wheels of different sizes. Wedges that can perform efficiently on different types of surfaces. Wedges that are placed in small spaces in those less used areas of the vehicles and that help its figure and aerodynamics.

PROPCA is a multi-purpose tool that provides the opportunity to create a solution to an immediate problem.

CapROP (Ser. No. 17/300,159) C. I. P. of PROPCA (Ser. No. 16/974,125) was designed for golf carts. This same concept can be applied to vehicle of all types, always observing safety rules.

6C Is a perspective view of the nail remover

Figure 2:
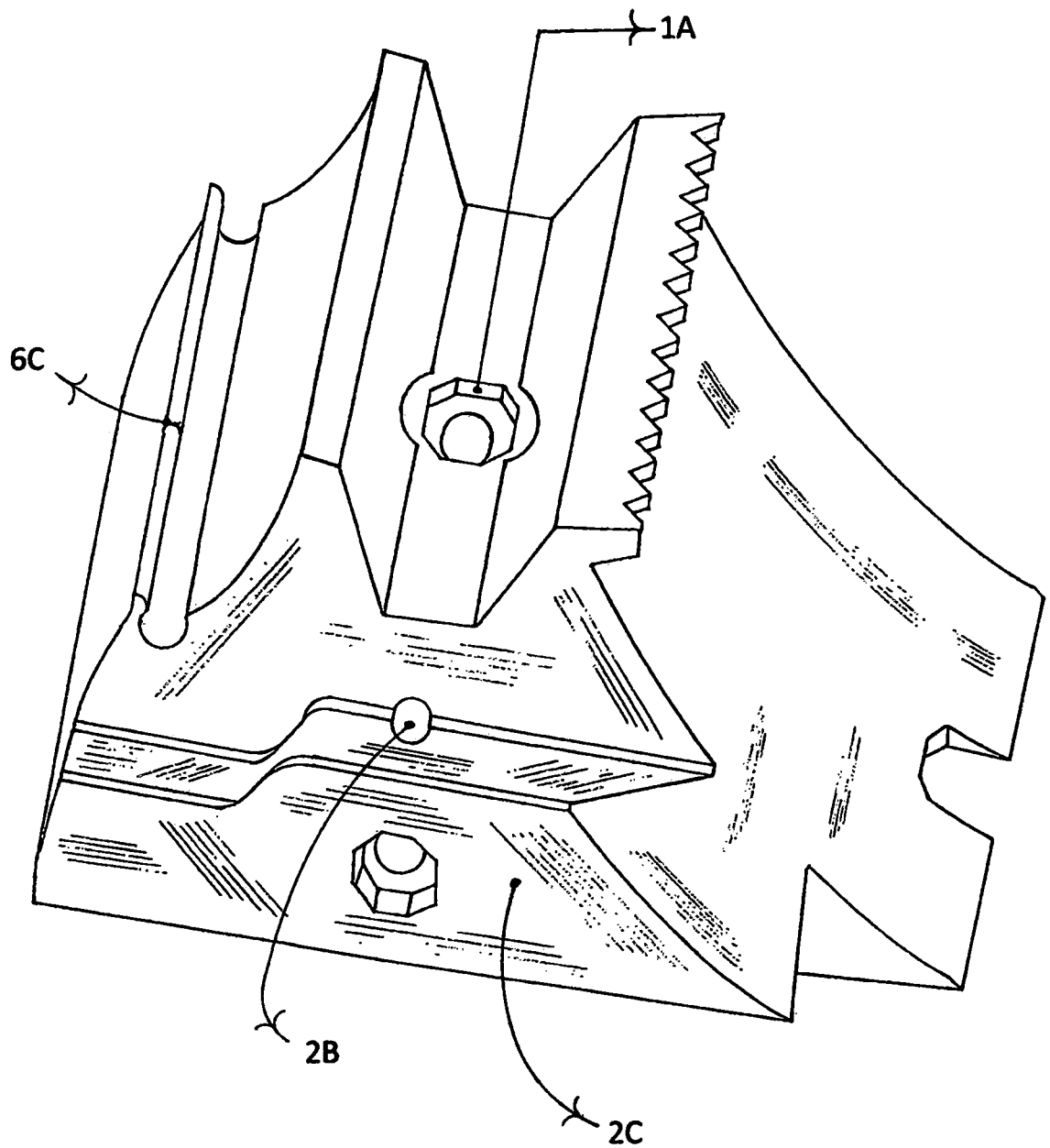
FIG. 2 Is a perspective view of right side of PROPCA. Depicts how it may coupled to port by lump.
Figure 3:
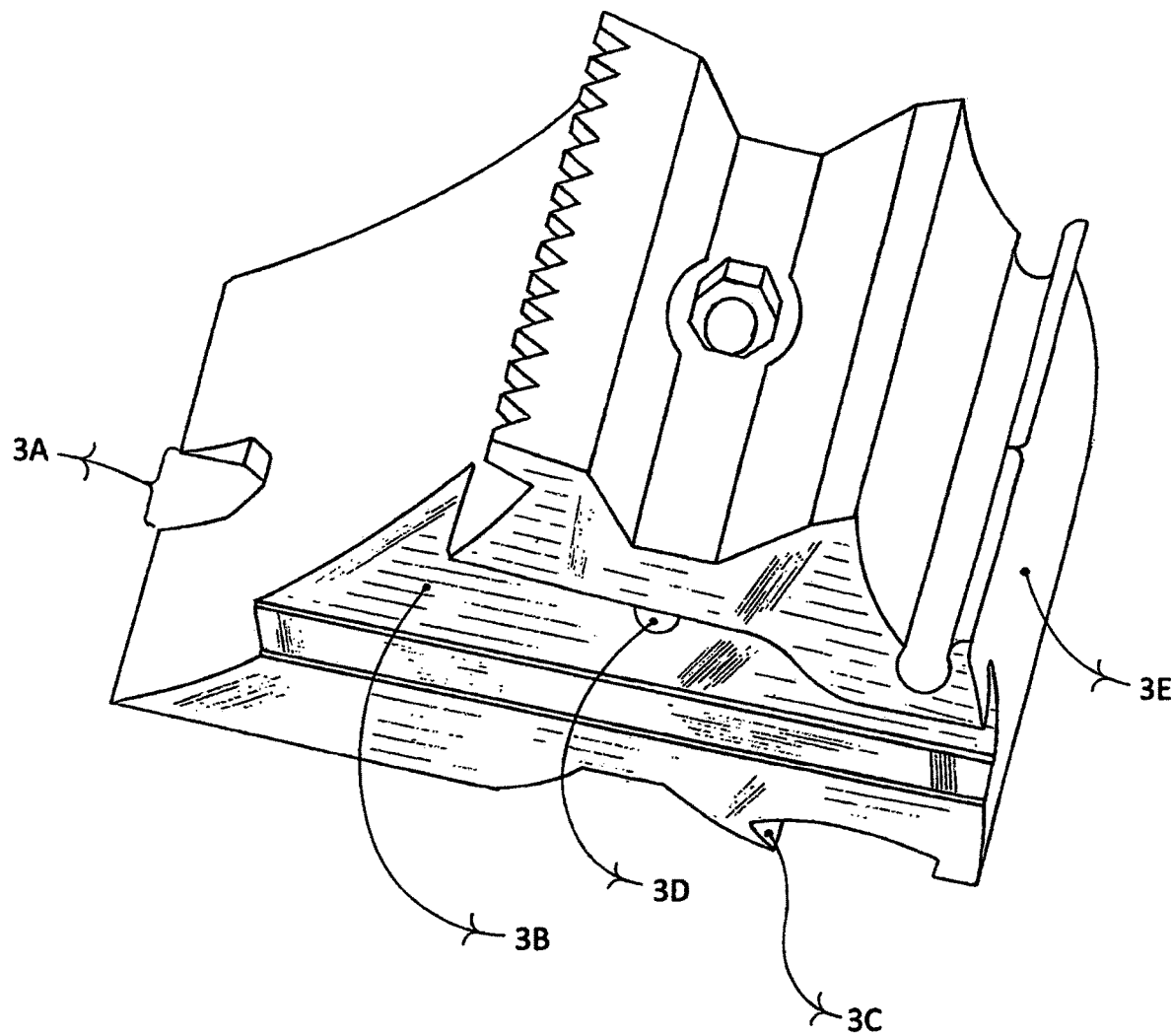

2B Is a perspective view of the small hole inside the canal 2C is a perspective view of the lump FIG. 3 Is a perspective view of the left chock with the groove 3A Is a ¾ inch wrench 3B Depicts the groove to receive the lump of chock in FIG. 2

3C Illustrates the area used as a bottle opener and the area to place a piece of not slippery rubber 3C1 25.

3D Is a hole without a ¾" octagonal space for a nut, a bolt or spike ¾" head.

3E Depict the area used as a hammer.

Figure 4:
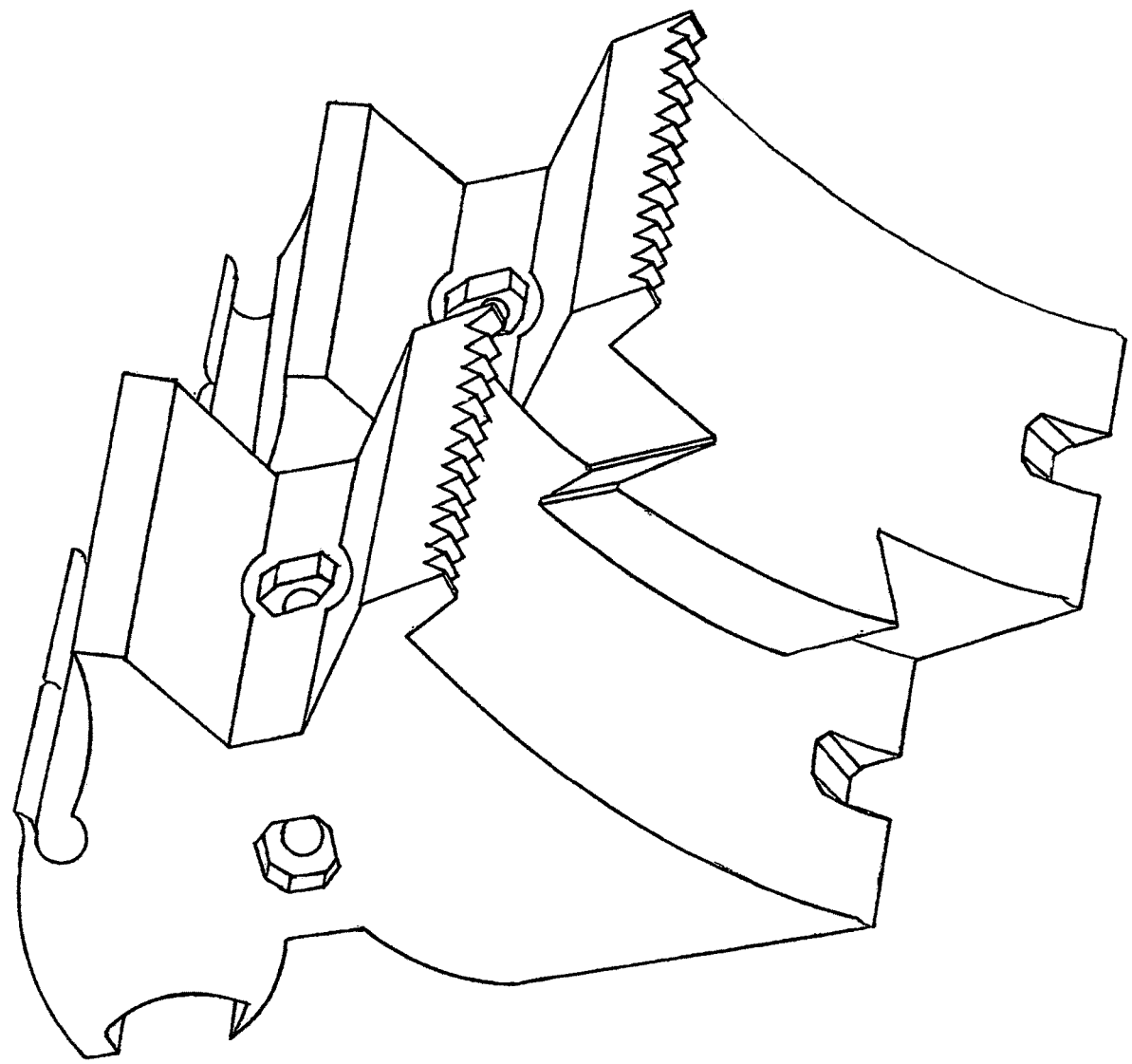

FIG. 4 Is a perspective view of how PROPCA can be separated

Figure 5C:
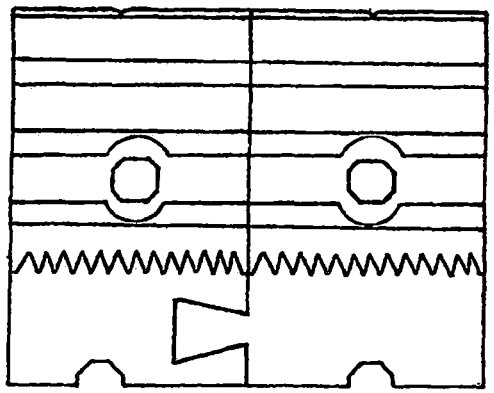
Figure 5:
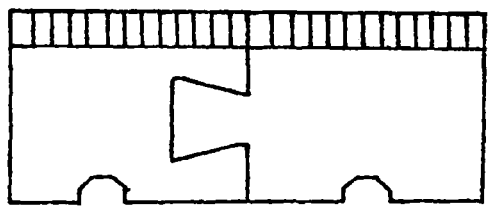
Figure 5B:
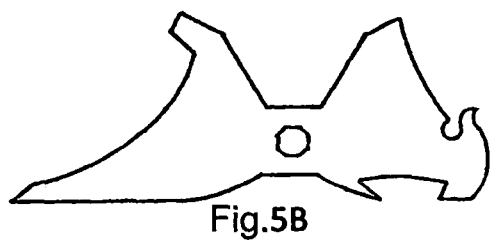
Figure 5D:
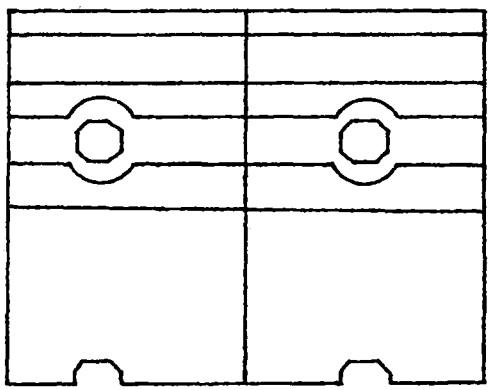
Figure 5A:
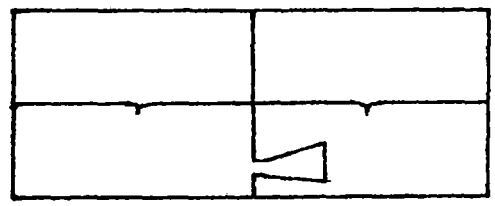

FIG. 5 Is a front plan view of PROPCA

5A Is a plan view of the rear area of PROPCA

5B Is a plan view of the right side of PROPCA. The left side view is a mirror view of PROPCA (as a whole)

5C Is a top plan view thereof

5D Is a bottom plan view thereof

Figure 6:
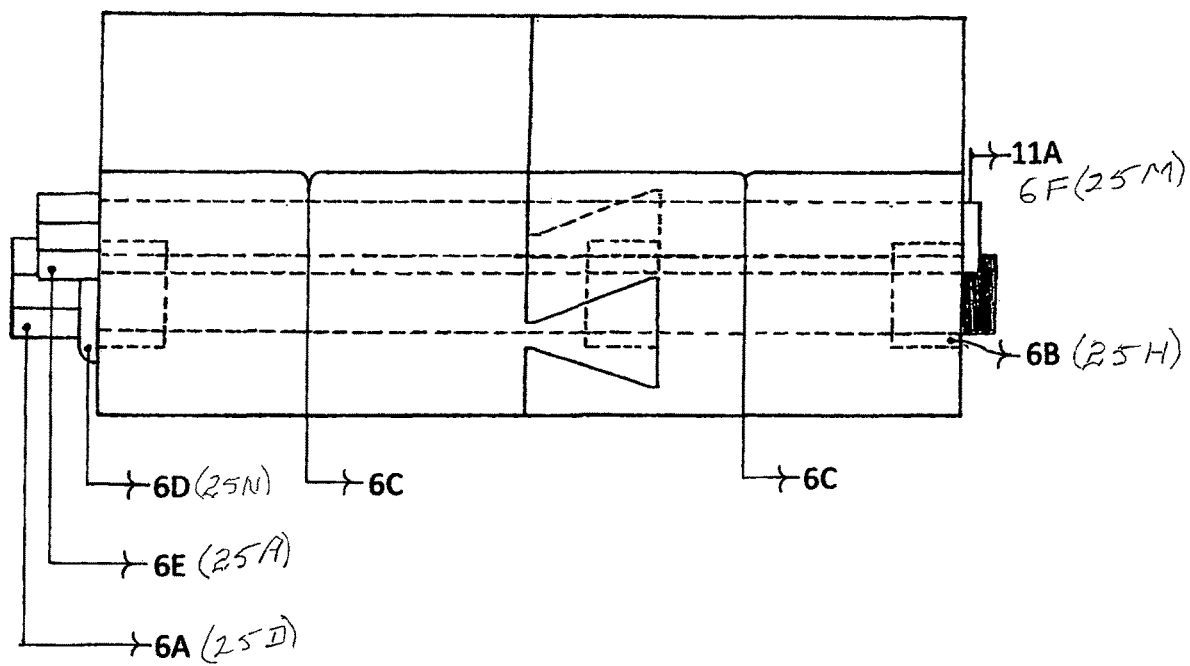

FIG. 6 Is the rear elevational view of PROPCA with the spike close to the nail remover area, fixed at the end with the clip 11A through the hole 11D 6A Depicts a partial view of the bolt head 11 crossing PROPCA.

6B Is a partial view of the octagonal shape nuts, inside the octagonal space cut by broken lines screwed at the end of the bolt.

6C Is a plan view of nail removers (2)

6D Is a partial view of the washer

6E Is a view of the spike 11 crossing the two chocks. It is behind the nails removers 6C.

Figure 7:
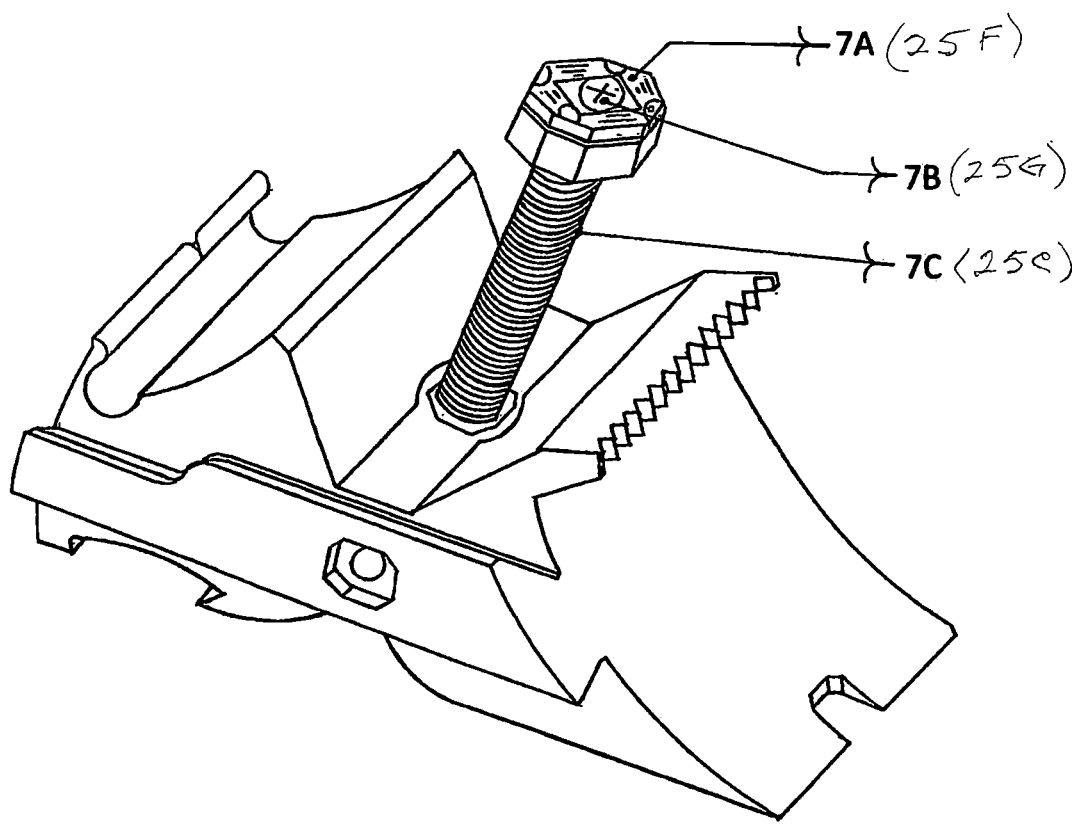

FIG. 7 Is a perspective view of chock used as a jack

7A Is a plan view of contour washer 25.

7B is a perspective view of the small bolt 25, to fix the contour washer.

7C Is a plan view of the 8 inches bolt ¾" head.

Figure 8:
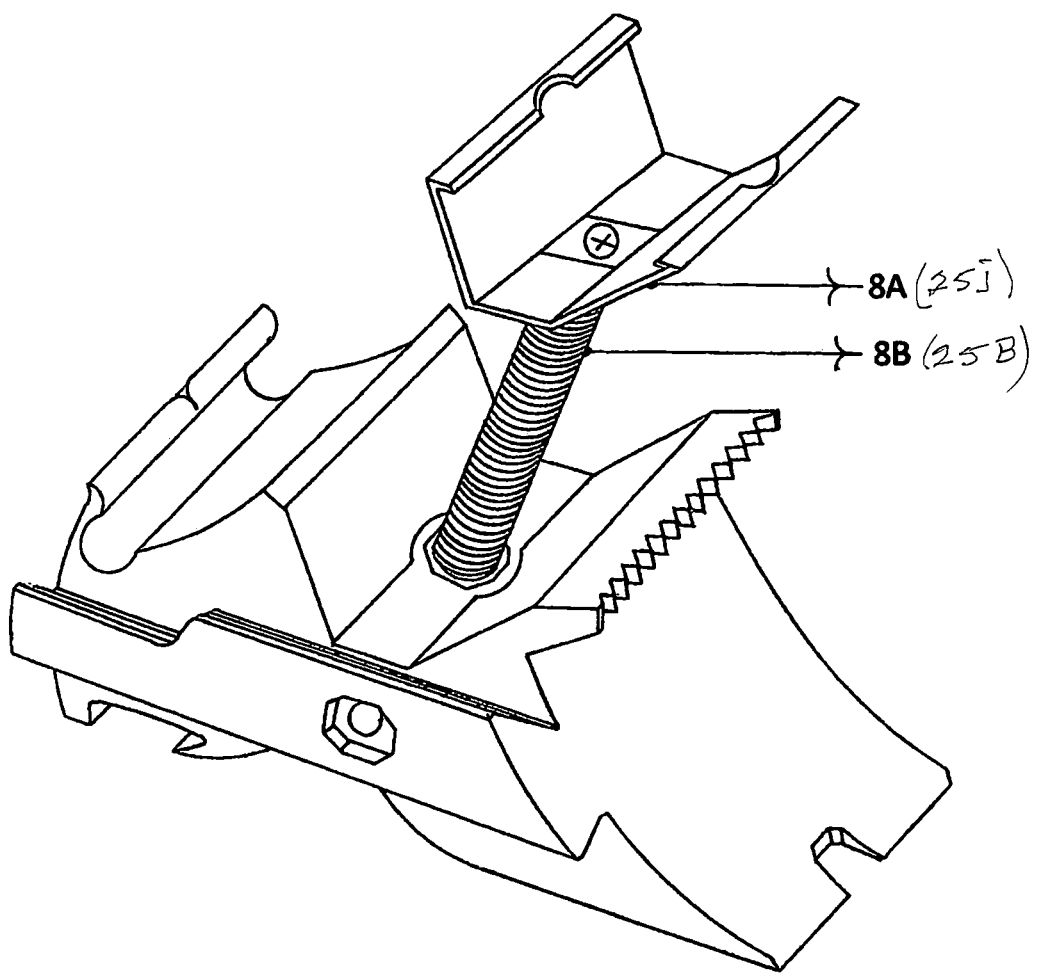

FIG. 8 Is a perspective view of a chock used as a jack.

8A is a perspective view of a jack with trapezoid shape piece of metal attached to the bolt head.

8B Is a plan view of 4½" bolt ¾" head.

Figure 9:
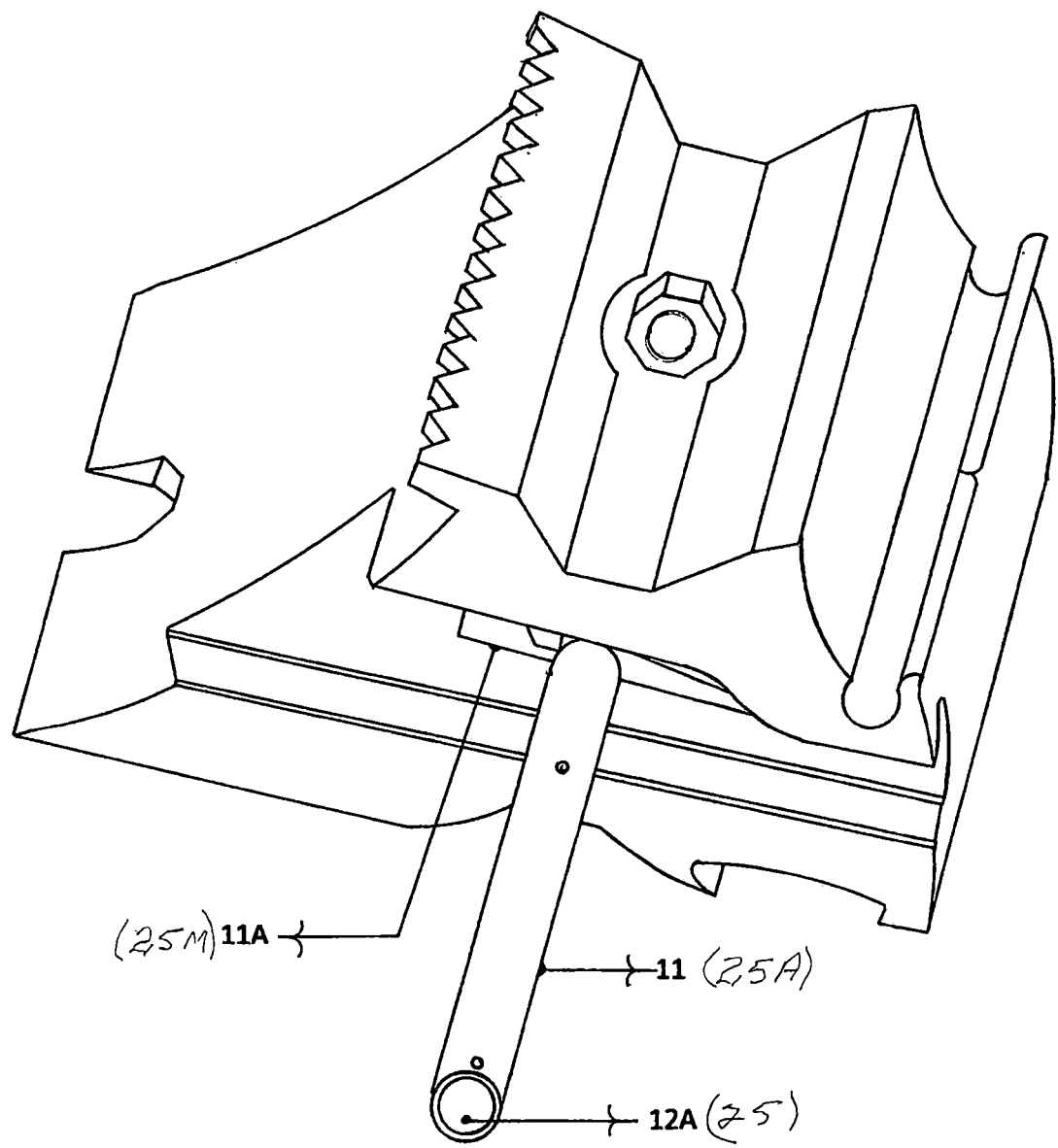

FIG. 9 Is a perspective view of the left side PROPCA with the spike 11 enters through the hole on the left side and is fixed on the other side with the clip 11A in the second notch 11C forming the scraper.

Figure 10:
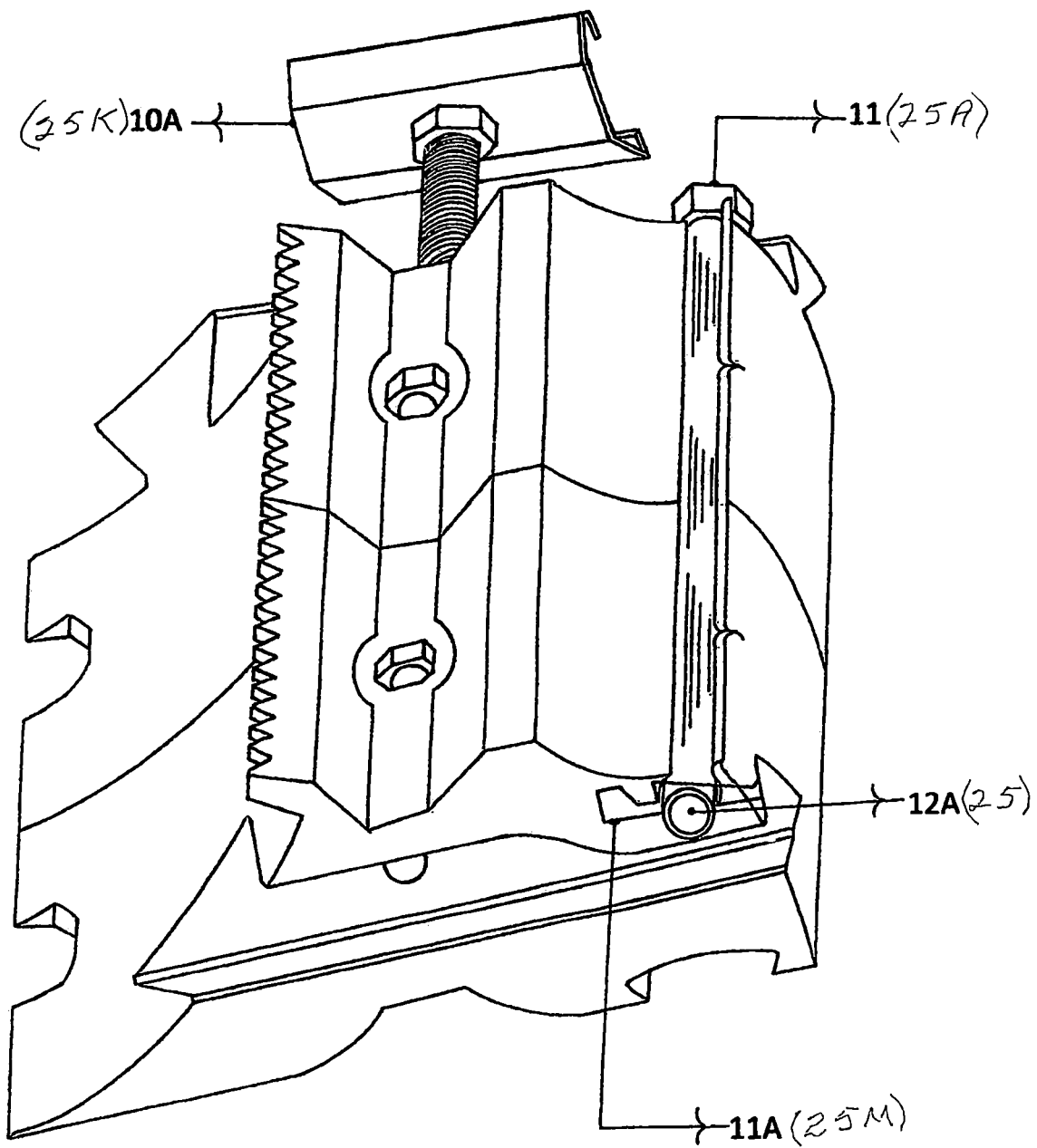

FIG. 10 Is a perspective view showing PROPCA as a jack reaching higher altitude. The spike 11 is in place to prevent slippage. Excessive weight could require the use of two nuts (an additional one in the center). Provides greater stability.

10A Is a perspective view of small trapeze.

11A Is a plan view of the clip.

12A Is a partial view of the bolt extension.

Figure 11:
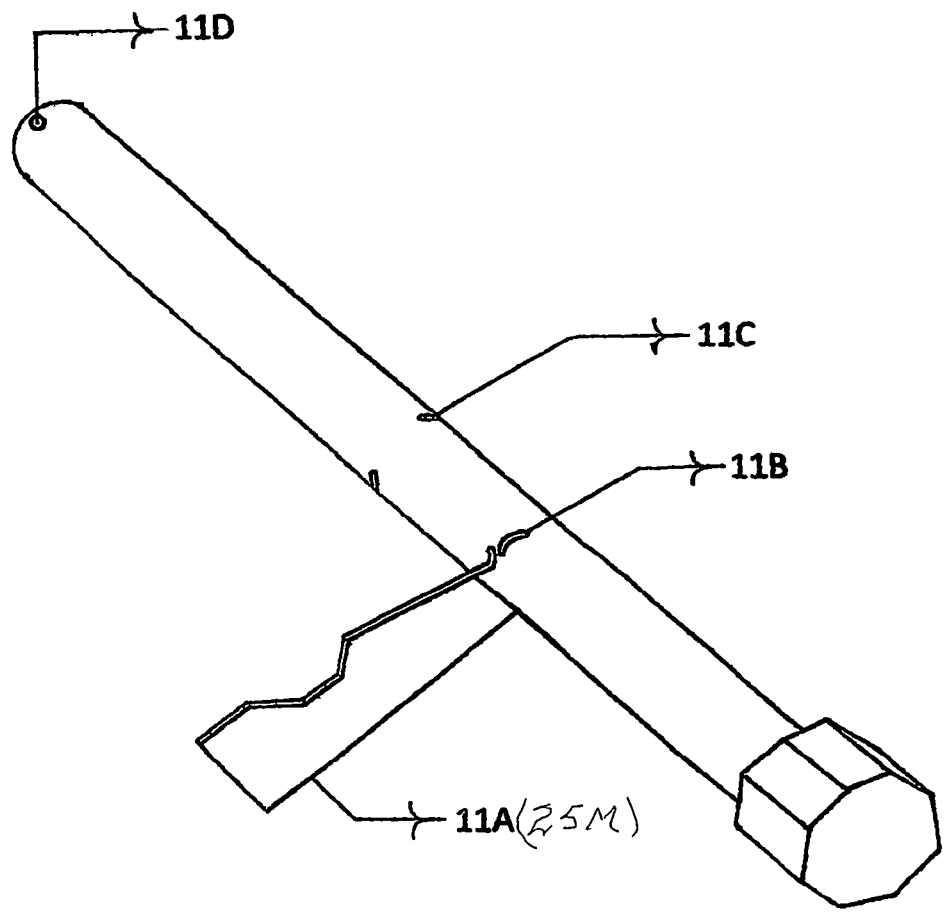

FIG. 11 Is a perspective view of the spike. Instead of a bolt, a spike allows to fix faster the tool needed. For illustration of the spike FIG. 12 and FIG. 13 have been added.

11A Is a plan view of the clip in the first notch 11B

11B Is a notch to fix the spike with the clip to the chock in vertical position (pickaxe).

11C Is a notch to use the chock horizontally (scraper) 9.

11D Is a small hole to introduce the clip that will hold the extension in place inside the spike and both in the predetermined place behind the nail remover of the wedge.

FIG. 12 Is a front sectional view taken along the spike 11

12A Is a plan view of the bolt to be screwed as an extension at the end of the spike.

The extension can also be inserted completely into the spike and held in place with the clip.

Figure 13B:
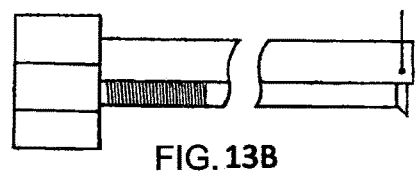
Figure 13C:
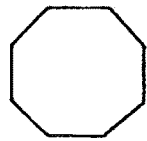
Figure 13:
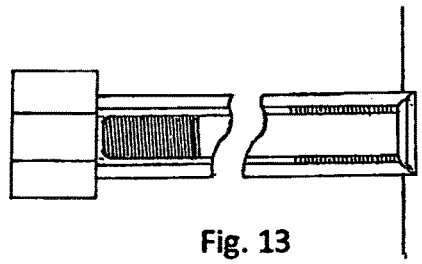
Figure 13A:
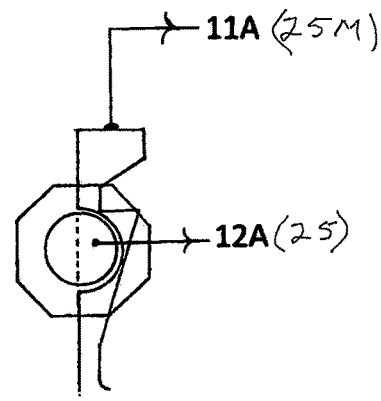

FIG. 13 Is a front sectional partial view of the spike 11

13A Is a right perspective view of the spike 11 with bolt 12A and clip 11A.

13B Is a top sectional partial view of the spike 11.

13C Is a left side of FIG. 13. A plan view of the ¾" spike head.

Figure 14C:
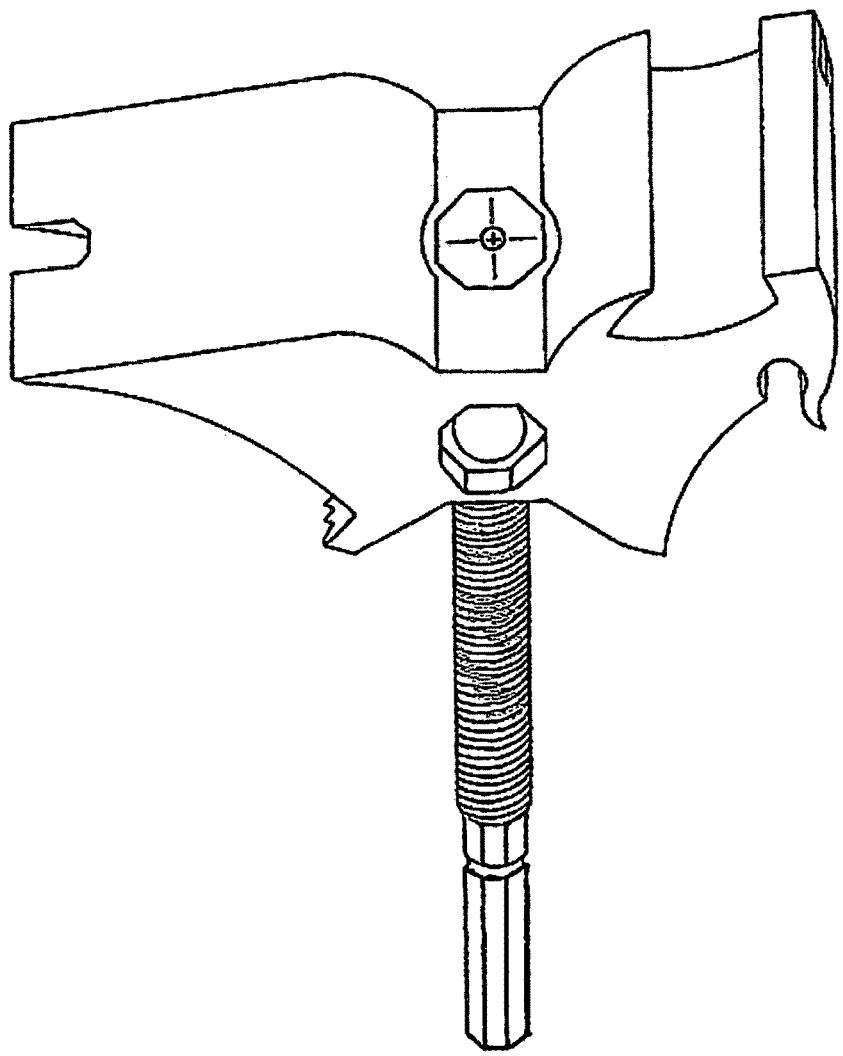
Figure 14B:
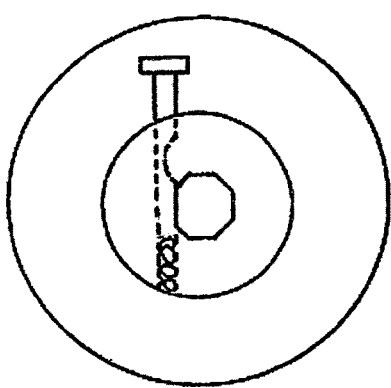
Figure 14A:
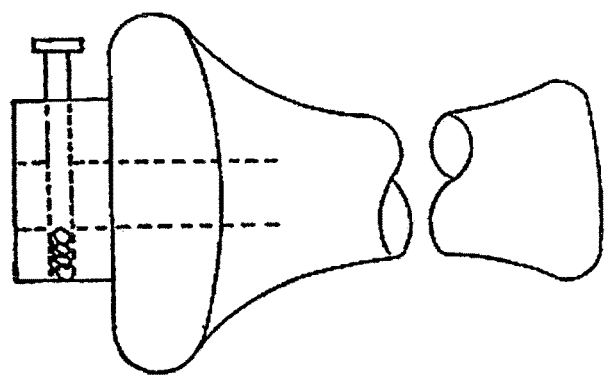

FIG. 14 Is a perspective view of the chock used as pickaxe.

14A Is a side view of the grip

14B Is a front side view of the grip

14C The bolt end allows a quick assembly of the grip.

Figure 15:
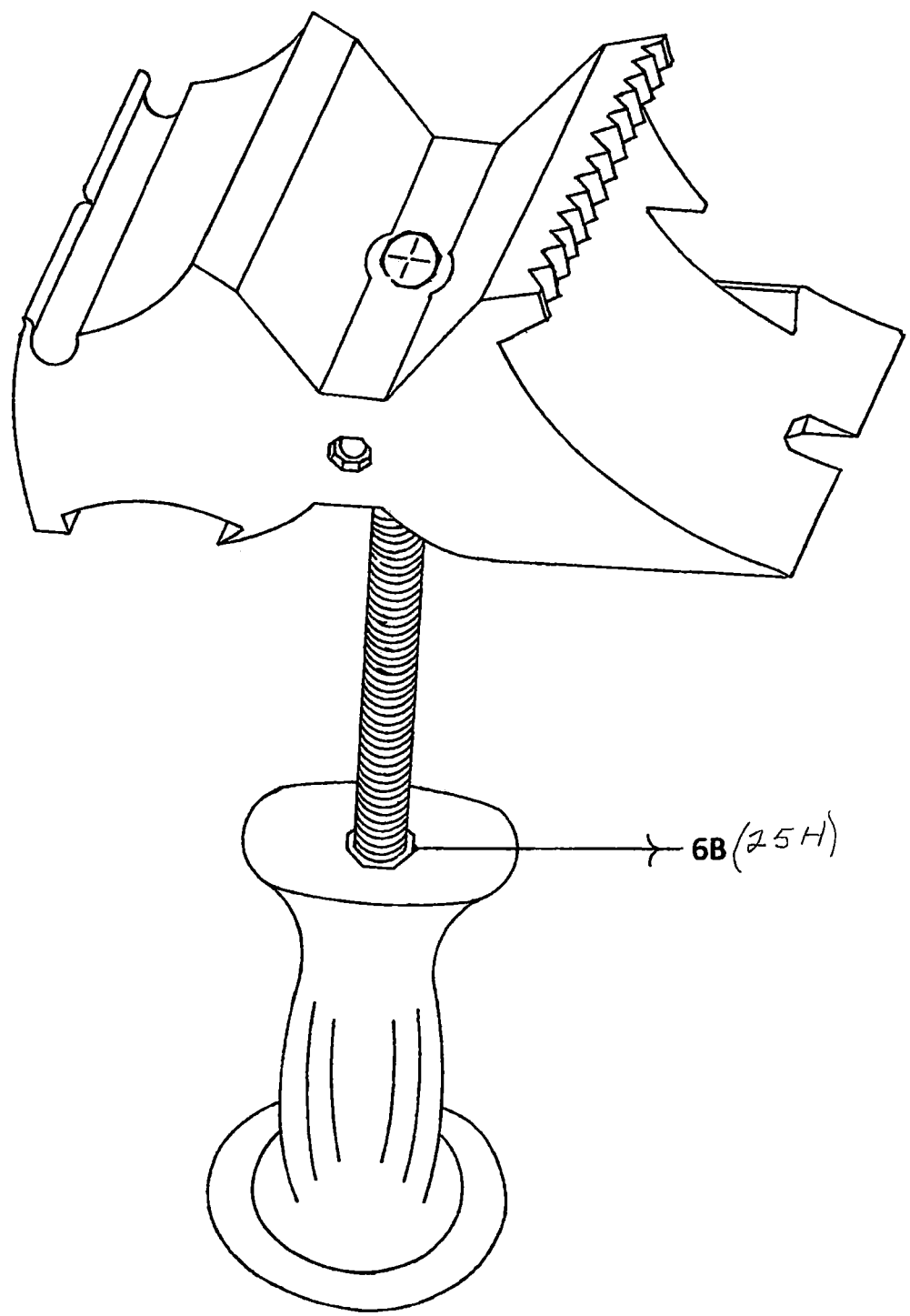

FIG. 15 Is a perspective view of the chock used as a scraper

6B Is a nut tide counter clock to avoid unwanted movement of the grip.

Figure 16:
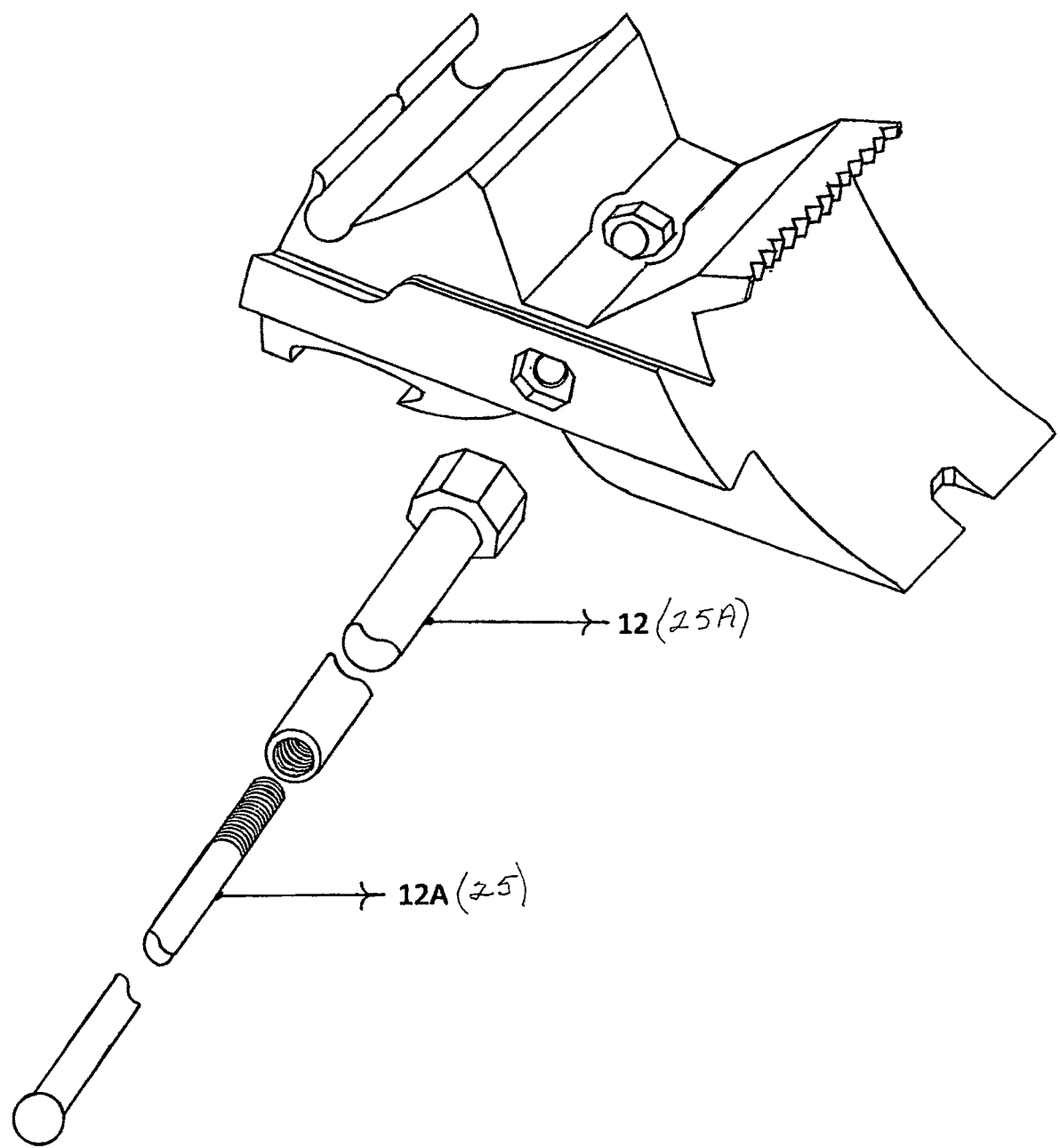

FIG. 16 Is a perspective view of the telescopic spike in a coupling position. It will be inserted in chock lump octagonal hole to be situated in specific place under the vehicle.

12 Is a perspective view of the spike.

12A Is a perspective view of the spike extension.

Figure 17:
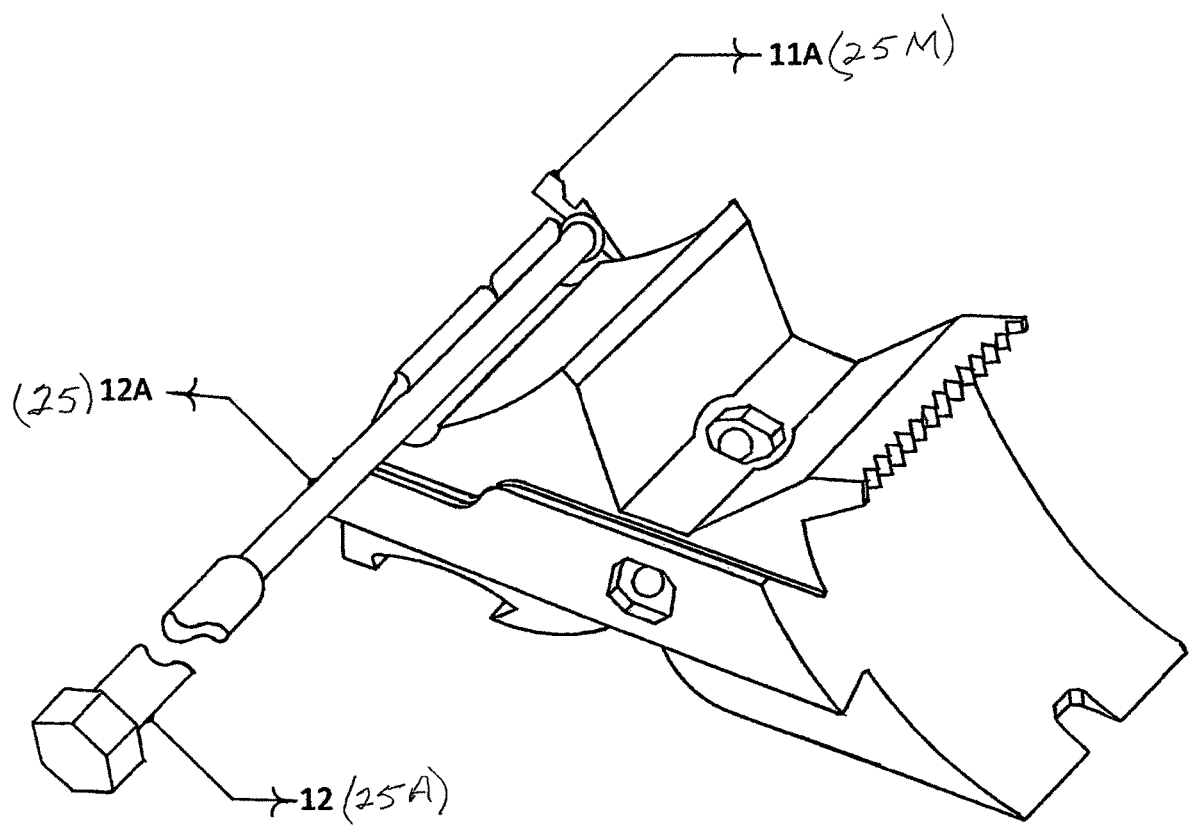

FIG. 17 Is a perspective view of the extension 10¾" long bolt 12A, threaded into the large spike 12, being placed in the nail puller area to recover it from under the vehicle. Also, could be used to recover the chock by placing it through the side octagonal hole to the middle and lifting and recovering.

Figure 18:
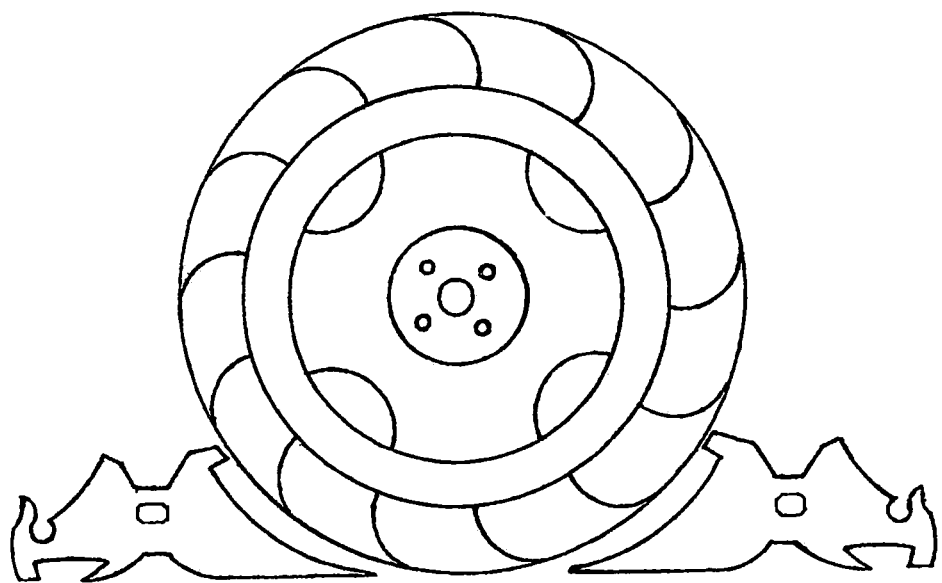

FIG. 18 Is a plan view. The split PROPCA is placed one on each side of the tire for restraining purpose.

Figure 19:
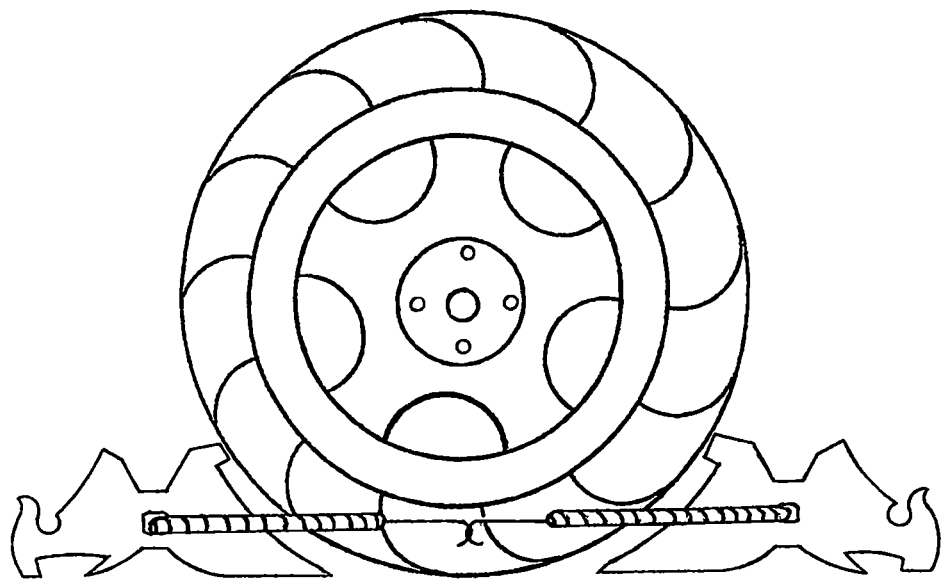

FIG. 19 Is a plan view. To maintain the chocks closest to the tire, an elastic rope or a bungie cord could be used to limit the movement the most.

Figure 20:
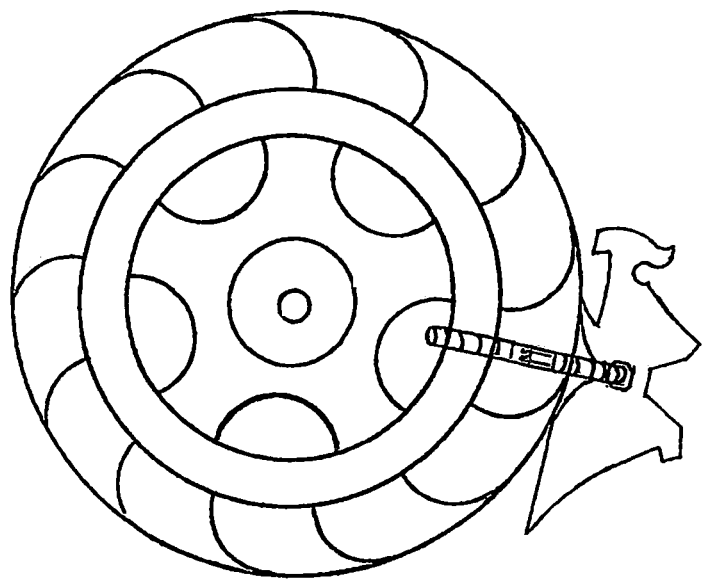

FIG. 20 Is a perspective view of a chock placed in position to unclog the vehicle.

Figure 21:
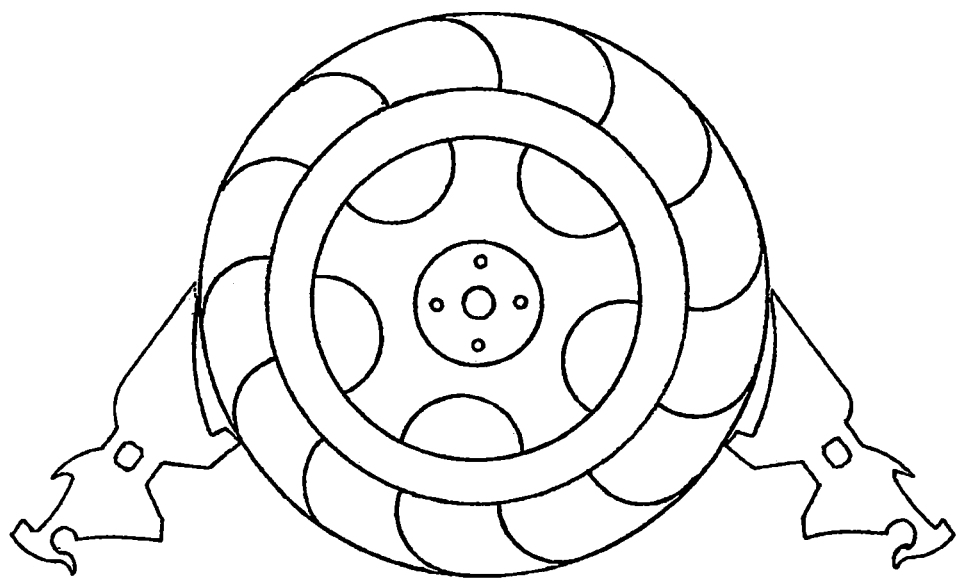

FIG. 21 Is a perspective view of two inverted chocks restraining from a higher position.

Figure 22:
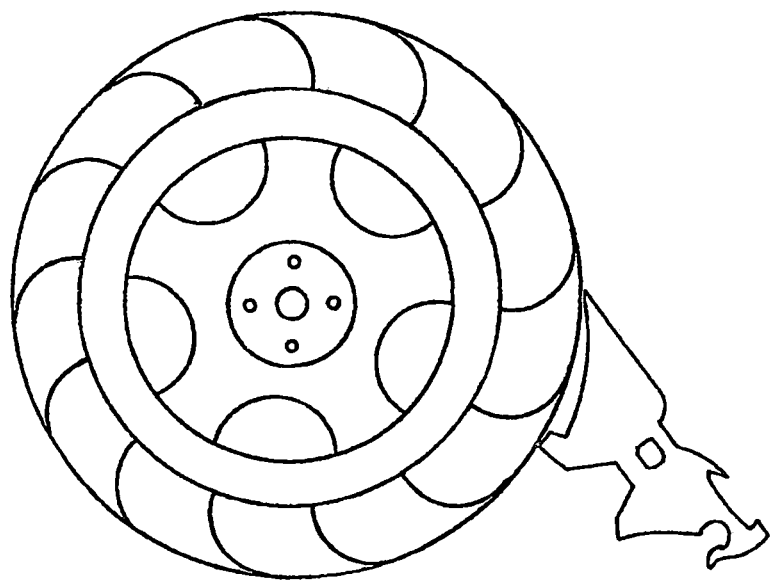

FIG. 22 Is a plan view of a chock in position to liberate a stuck vehicle.

Figure 23:
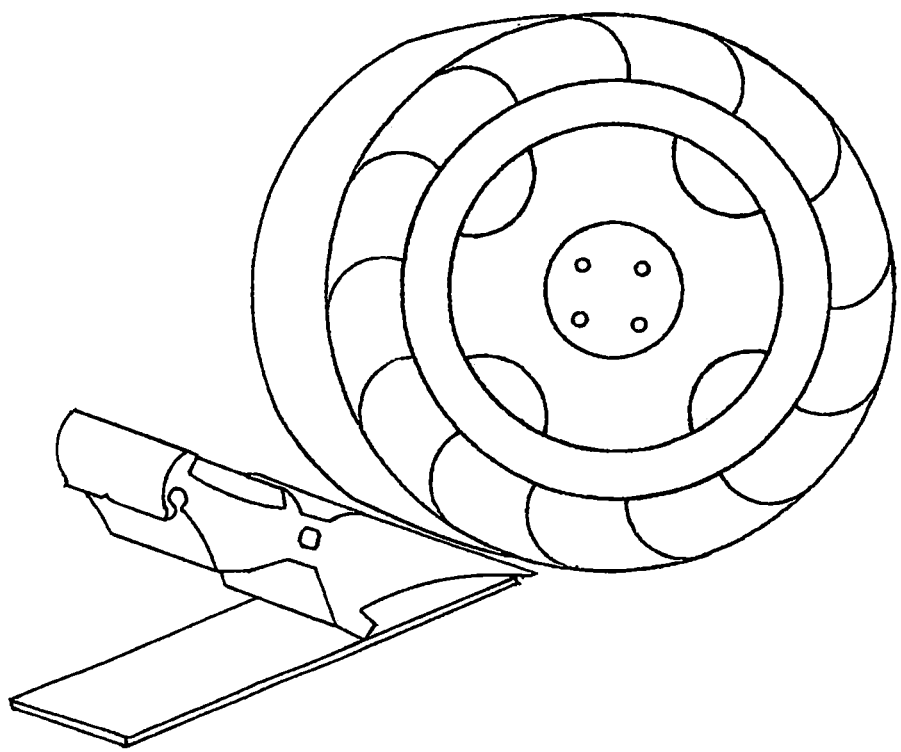

FIG. 23 Is an elevational view of an inverted chock on a piece of board to avoid slippery.

Figure 24:
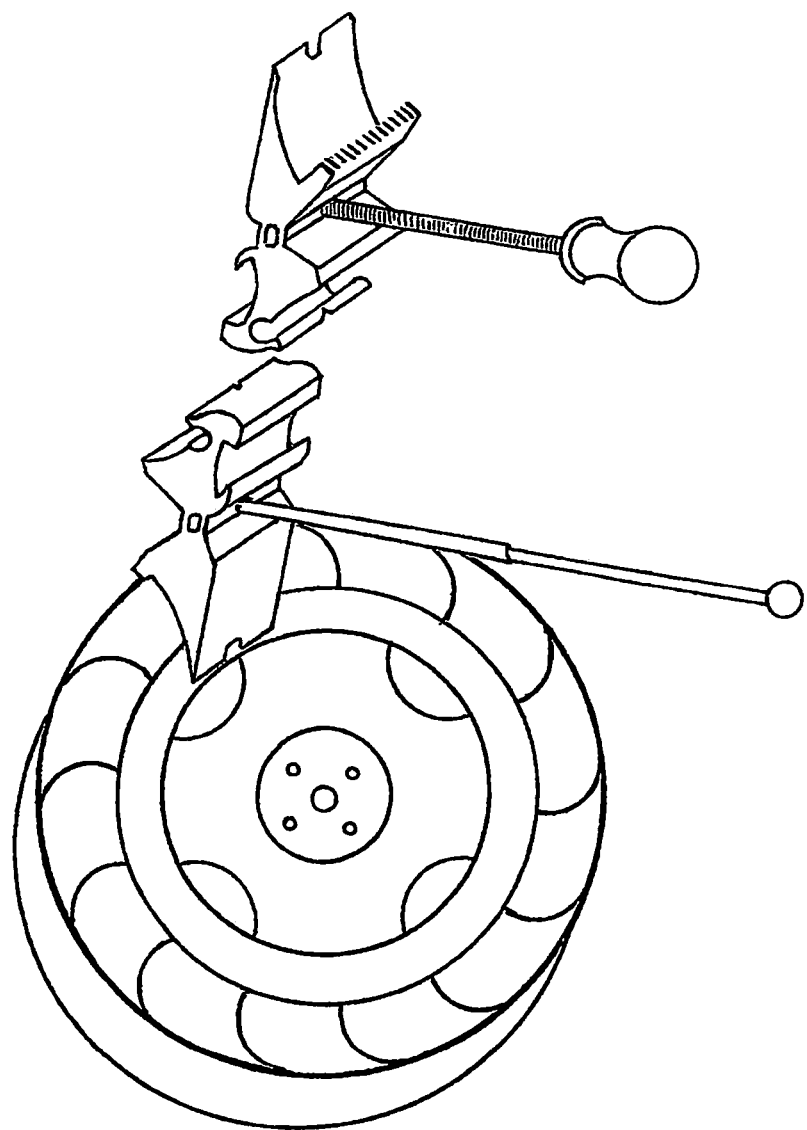

FIG. 24 Is a perspective view of chocks with the handles working to remove the rim from the flat tire.

FIG. 25 Is a perspective view of different items utilized by PROPCA to perform different tasks.

6B Is a perspective view of the 3¾" nut.

25A Is a perspective view of the bigger trapeze.

8A Is a perspective view of the middle size trapeze.

10A Depict the smaller trapeze.

3C1 Is a perspective view of a piece of rubber to be fixed in 3C area to avoid slippery.

12A Depict the extension screw that will be located inside the spike.

FIG. 11 Depict the 11" spike.

8B Depict the 4 ½" bolt

7C Depict the 8" bolt

6A Depict the 11" bolt

14C Depict the 11" bolt for immediate grip.

7A Depict the contour washer to attach on bolts head.

7B Depict the small bolt 1" long to attach additaments.

DETAIL DESCRIPTION OF FIGURES

Figure 1:
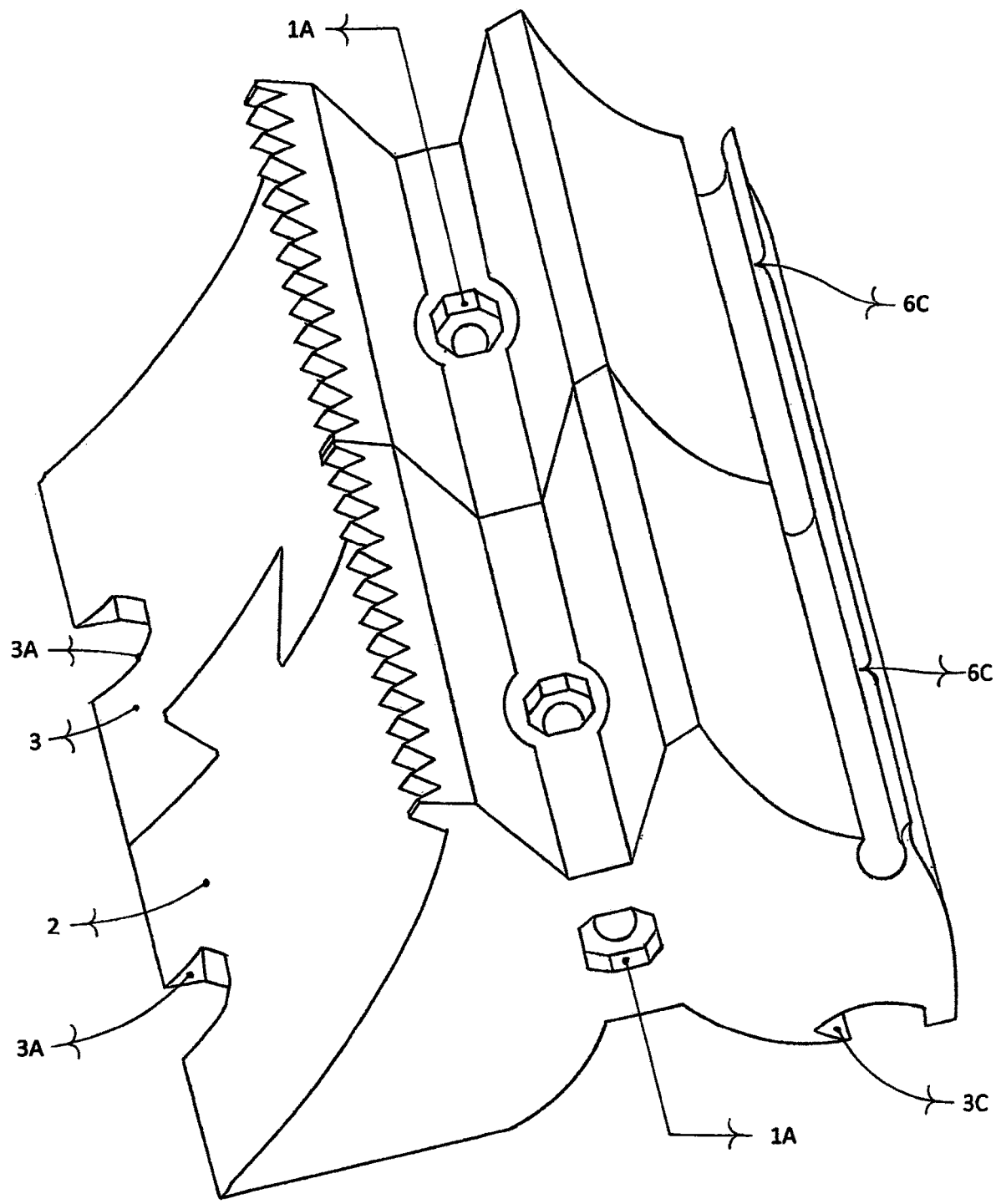
FIG. 1 is a perspective view of PROPCA. Illustrates the whole chock comprising FIGS. 2-3

FIG. 1 Is a perspective view. PROPCA is a tool composed of two chocks, FIGS. 2-3.

Each one has specific holes that allow to create different tools.

1A Is a ¾" octagonal hole to harbor the bolt or spike head.

FIG. 2 Is the wedge conforming right side of PROPCA. It has four ¾" octagonal holes.

FIG. 3 Is the wedge conforming left side of PROPCA. It has three ¾" octagonal holes.

3A Is a ¾" wrench

3C Is an area used as bottle opener. Also could accept a piece of not slippery rubber 3C1 25 to be used on hard surfaces to avoid sliding.

6C Are nails remover in both chocks.

FIG. 2 Is a perspective view of the right side of PROPCA. It depict the lump and in it the octagonal hole to reach the higher altitude when raising the vehicle, FIG. 10.

1A Is a ¾" octagonal hole to harbor the bolt or spike head and ¾" nut 6B

6C Is a nail remover

2B Is a small hole to tie a nylon when fishing or when using the chock underwater, to avoid loosing it after liberating a stuck vehicle.

2C Is the lump coupling the groove 3B on the other chock, FIG. 3

FIG. 3 Is a perspective view of the left part of PROPCA. It depict the groove 3B and a hole 3D, without the area for an octagonal nut or bolt head.

3A Is a ¾ inch wrench

3B Is the groove to receive the lump of FIG. 2C

3C Could be used as a bottle opener. Also prevent slippage if used on soil, or accept a piece of not slippery rubber 3C1 25, to be used on hard surfaces.

3D Is a hole without a ¾" octagonal space for a nut or a bolt or spike ¾" head.

The 3¾" octagonal hole is on the lump.

3E Depict the area used as a hammer.

FIG. 4 Is a perspective view. Those two chocks are joined by a groove and a lump.

When slide to separate, those two chocks are tools to perform different tasks due to strategically situated ports for different sizes bolts or spike.

FIG. 5 Is a front plan view of PROPCA with ¾" wrench

5A Is a plan view of the rear area of PROPCA.

5B Is a right-side plan view thereof. The left side is a mirror view of right side of PROPCA as a whole.

5C Is a top plan view thereof. The square figure shows the different shapes and sizes of the particular tools.

5D Is a bottom plan view thereof. Holes goes through the chock in deepest area of the bottom. The side holes intersect with the others holes in the center.

FIG. 6 Is the rear elevational view of PROPCA. Both chocks tightly closed with a fine thread bolt 6A and nut 6B. The nail remover 6C, in both chocks is observe. The washer 6D is used to avoid the bolt head get in the octagonal hole. The spike 6E and the clip 11A at the other end, through the spike hole 11D.

Note: The nut 6B also could be in the middle of PROPCA when used sideway as a jack 10 for stability. The nut 6B, should be placed in the octagonal space for tightening purpose. The bolt head should not enter in the octagonal space. A washer, 6A is used to avoid it.

FIG. 7 Is a perspective view of a chock used as a jack.

7A Is a plan view of contour washer 25.

7B Is a perspective view of the small bolt head, to fix the contour washer 7A.

7C Is a plan view of the 8" bolt ¾" head. The 8" bolt head has a small-drive with threads in the head center and a small bolt 1" long is screwed on top of it to sustain the hardened contour washer.

FIG. 8 Is a perspective view of chock used as a jack.

8A Is a perspective view of a trapeze shape figure.

8B Is a plan view of 4½" bolt 25.

The contour washer was taken off by unscrewing the small bolt and trapeze shape FIG. 8A was connected. Trapezoids come in different sizes for better adaptation to higher or lower altitude 25.

FIG. 9 Is a perspective view of the left side 2 PROPCA with the spike 11 enters through the hole on the left side and is fixed on the other side with the clip 11A in the first hole 11B.

FIG. 10 Is a perspective view showing PROPCA, both chocks working together as a jack. Different trapezoids size to reach higher or lower altitude 25A, 8A or 10A. Could be observed in FIG. 25. The spike 11 is in place to prevent slippage. A nut 6B is on top of the lump and in the middle of PROPCA. Both nuts should be placed and the bolt should go through them at the same time. The spike in place is necessary for stabilization.

FIG. 11 Is a perspective view of the spike thereof. For illustration of the spike FIG. 12 and FIG. 13 have been added. Instead of a bolt, a spike allows to quick assembly of the required tool. 11A Is the clip to be used in two holes, 11B, 11C and in the hole at the end 11D. The octagonal spike head get into the side octagonal hole of the chock 9 and is fixed in place by a clip 11A using the first notch 11B, from the head of the spike to get a spatula 9. The chock twisted to cut sideway.

FIG. 12 Is a front sectional view taken along the spike 11

12A Depict the bolt to be screwed as an extension at the end of the spike. It is kept inside the spike by the clip fixed through the hole 11D. The extension could be unscrew all the way out or unscrew to form an extension of the spike 16.

FIG. 13 Is a front sectional view of the spike with the extension inside. The clip 11A keeps the bolt 12A in place.

13A Is a right side elevational view. By removing the clip 11A, the bolt comes out and could be unscrewed to form an extension or unscrewed all the way out for any other purpose.

13B Is a top side partial elevational view. Depict the bolt inside the spike.

13C Is a left side view. Depict the head ¾" of the spike.

FIG. 14 Is a perspective view of the chock as a pickaxe. The bolt end allow a quick fix of the grip.

14A Is a side elevational view of the grip.

14B Is front elevational view of the quick grip.

14C The bolt end allows a quick assembly of the grip.

FIG. 15 Is a perspective view of the chock used as a scraper.

6B Is a nut tied counterclock to avoid unwanted movement of the grip.

FIG. 16 Is a perspective view of the extension bolt in docking position. It will be inserted into the octagonal hole to place the wedge as a tower in the indicated place under the vehicle.

12 The spike head will be placed in chock lump octagonal hole.

12A Is the bolt used as an extension of the spike. The bolt 12A could be used to recover the chock by placing it through the side octagonal hole to the middle, lifting and recovering.

FIG. 17 Is a perspective view of the small bolt 12A threaded into the large spike 12 being placed in the nail remover area. The clip 11A at the end of the bolt extension helps to retrieve the chock from under the vehicle. The bolt 12A can enter through the octagonal space of the center of the chock, lifting and recovering from under the vehicle.

FIG. 18 Is a perspective view. The split PROPCA is placed one on each side of the tire for restraining.

FIG. 19 Is a plan view. To maintain the chock closest to the tire, an elastic rope or a bungie cord could be used to limit the movement the most.

FIG. 20 Is a perspective view of a chock placed in position to unclog the vehicle. The rope enter through the side octagonal hole and fixed to tire. If it is too wide, the whole PROPCA could be attached.

FIG. 21 is a perspective view of two inverted chocks restraining from a higher position.

FIG. 22 Is a plan view of a chock in position to liberate a stuck vehicle. Also, is the way to release immediately any object or extremity caught under the vehicle or the rubber.

FIG. 23 Is an elevational view of an inverted chock on a piece of board to avoid slippery.

The tire could reach the middle of the chock for immediate lift. A tower should be place for safety when changing oils.

FIG. 24 Is a perspective view of chocks with the handles working to remove the rim from the flat tire. Both chocks are using the hammer area.

FIG. 25 Is a perspective view of different items utilized by PROPCA to perform different tasks.

6B Is a perspective view of the ¾" nut.

25A Is a perspective view of the bigger trapeze.

8A Is a perspective view of the middle size trapeze.

10A Depict the smaller trapeze.

3C1 Is a perspective view of a piece of rubber to be fixed in 3C area to avoid slippery.

12A Show the extension screw that will be located inside the spike 11.

FIG. 11 Depict the 11" spike.

8B Depict the 4½" bolt

7C Depict the 8" bolt

6A Depict the 11" bolt

14C Depict the 11" bolt for immediate grip.

7A Depict the contour washer to attach on bolts head.

7B Depict the small bolt 1" long to attach additaments.

DETAIL DESCRIPTION OF THE INVENTION

Those two chocks together are the first embodiment of PROPCA1. Those are tied firmly by a lump 2C, a groove 3B, and 11 inches bolt 6A, with nut 6B, and a washer 6D. As a whole, PROPCA could be used to restrain big tires on steep grade. PROPCA could be pull apart, to form two chocks 4. The chock with the lump 2C, is larger than the chock with the groove 3B, it is noticeable when used sideways (vertically) 10. It gives the opportunity to take the one that better fix the space between the floor and the bodywork or chassis. To assemble PROPCA, once the bolt 6A, is twisted out of the nut 6B, pulled all the way out, with washer 6D, the chocks are still tied by the lump 2C, and the groove 3B. Now, the chocks will be liberated by only sliding them 4. Each chock has almost the same utility. As a jack in vertical position the contour washer 7A is fixed to the 8" bolt head 25(6A) with a 1" bolt 25 (7B). The contour washer can be replaced by the trapezoidal figure. One more alternative to adjust the ideal piece for the space available between the floor and the bodywork or chassis. As a spatula 9, in chock 3 the spike 11 going through the hole on the left side of the chock and is fixes on the other side with the clip 11A in the second notch 11 C. To reach the higher altitude 10, is necessary to use the octagonal space of the lump 2C. Both chocks should be back to back and two nuts should be use, each nut should be on top of each chock in the octagonal space, helping each one in the process of lifting. The bolt 6A should screw both nuts at the same time. For more stabilization the spike 11 should be introduced in nail puller area 6E. The extension bolt 12A is inside the spike. The clip is through the hole 11D to keep the spike in place. The spike has two notches 11B-C to facilitate different positions of the chock. Notch 11B is used to form the pickaxe. At the end of the spike, the small hole 11D keeps the extension bolt inside the spike. The extension bolt 12A could be unscrew to form an extension of the spike 16 or unscrew all the way out for any other purpose. Ex. Unjam the wedge in the mud. The extension of the spike can penetrate the side hole in the wedge and help unclog it.

To get the pickaxe the bolt 6A, 14C or 11 should enter through bottom hole of the chock 14. The bolt 14C with quick grip 14A is used as a hammer, pickaxe and a nail puller. To get the scraper, hammer or bottle opener, the bolt 25(6A) or the spike 11 should enter through the hole on top 2(1A) of the chock. The bolt head should enter in the proper space to avoid undesirable movement of the chock. The washer must precede the nut when screwing to prevent it from entering the octagon. The handle 15 also could be locked with counter clockwise nut 6B. The spike with the extension bolt 16 could be used to place the chock as a tower or jack in the indicated place under the vehicle. The spike head 16(12) will be placed in chock lump octagonal hole 16. The threaded spike extension can be used to position the chock in a specific location under the vehicle. It can also be used to recover the chock from under the vehicle by placing the bolt extension extreme without thread and clip through the side octagonal hole to the middle of the chock, lifting and recovering from under the vehicle. The extension bolt 12A threaded into the spike 12 being placed in the nail remover area 17, the clip 11A at the end of the bolt extension also helps to retrieve the chock from under the vehicle.

The split PROPCA could be used to restrain by placing one on each side of the tire 18. To maintain the chock closest to the tire, an elastic rope or a bungie cord could be used to limit the movement the most 19. If PROPCA is used in RVs it is recommended that a rope with a padlock be used during periods of inattention.

The teeth provided on the highest part of the chock 18 are the first to make contact facilitating the abutting engagement with the wheel of the vehicle. The force applied to those teeth will create a torque counter clock wise, which will force the chock to cling more to the hard ground, with the piece of non-slip rubber or, if the ground is soft, the non slip rubber has to be removed, leaving uncovered an area that, the highest pressure, greater resistance created. The inverted chock also could be used to liberate a stuck vehicle. If there is water and mud, the tire probably slip. In that case is necessary to pass a rope through the rim and to the chock side hole to tie them together 20. If the tire is too wide, PROPCA should be used as a hole 1, but the bolt or spike should be substitute by the rope to tight through the rim. The bolt or spike could be placed in nail remover area 6C. If the distance between the car body and the tire is more than 7" the chock could be left until the vehicle is completely out of stuck. It is recommended to use one chock at a time to avoid both being trapped. At all times the vehicle must be moved slowly to avoid accidents.

The utilization of inverted Props, on each side of tire increases the power to restrict the movement by impacting an upper area 21. Also could be used to liberate stuck vehicle 22, releasing immediately any object or extremity caught under the vehicle or the tire. Another way to lift the vehicle immediately is with an inverted chock on a piece of board to avoid slippery 23. When the tire taxi way touch the chock contact surface, that load will be transfer to the ground surface directly to the piece of board preventing it from slipping 23. The tire could reach the middle of the chock to stay elevating 23. A tower should be place for safety when changing oils. PROPCA (Chock Assemble System) with handles could work removing the rim from the flat tire 24.

PROPCA (FIG. 2 and FIG. 3) is disassemble. Each wedge with its handle, a screw or a spike, using it individually to separate the tire from the rim, repair the tire and return it to the rim 24. In this case the wedge side with the spike is placed between the tire and the rim. The second chock with the screw and handle, will be hitting with the hammer area, on the back, hammer area of the first chock. Chocks can be swapped, the top at the bottom or vice versa. The angle of the wedge can be directed depending on the need for takeoff or separation. The angle of the first wedge, would be directed to the tire. If chocks are swapped, the angle of the second wedge would be directed toward rim. Both chocks are using the hammer area. Different views of items utilized by PROPCA to perform different tasks are shown in 25.

FIG. 26 is an open end wrench with lump. The head of the extension is driven until reaching the wall. The clip could be installed to ensure that the wrench will stay in place to continue doing its job. The inserted clip limit the movement and facilitate tool control. The edge of the left side wrench will go beyond the sides of the screw to rise and engage the head of screw. The wrench is specially made to facilitate the lift and lower the vehicle with PROPCA. The spike extension rest on wrench corner when lifting or lowering the vehicle helping by providing torque support. FIG. 11A (the clip) must be installed on the head of the spike extension to secure it to the wrench. FIG. 12A is the spike extension. FIG. 26A is a wall to stop the head of the spike extension. FIG. 26B is the head of the spike extension.

In FIG. 27 the two inverted chocks in position to pull a stuck vehicle. The lower chock is attached to fix object with a rope. The upper chock will be leveraging to pull the vehicle. In FIG. 27A two inverted chocks in position to pull a stuck vehicle. The lower chock is buried halfway to acquire a support point given the lack of a fixed object. The greater the resistance of the stock vehicle, the greater depth and grip the wedge will present. Someone standing on the ends of the buried screw while someone else leverages, makes the job easier.

FIG. 28 illustrate how a tire could be restrained by two chocks and a rope looped around the rim and secured with a padlock. It can discourage a theft attempt while resting inside the RV overnight.

It will be understood that the above described embodiments are for purposes of illustration only and That changes and modifications may be thereto without departing from the spirit and scope of the invention.

What is claimed:

1. A wheel chock assembly comprising:
a first ramped piece, or first ramped chock, having a toothed profile provided on an upper side thereof;
a profiled projection provided along the length of a lateral side thereof;
a second ramped piece, or second ramped chock, having a toothed profile provided on an upper surface thereof;
the second chock having a profiled recess provided along the length of a lateral side thereof;
said profiled recess matches the profile of the projection of the first chock so that the first chock and the second chock of the wheel chock assembly can be joined together in an interlocking relationship to form said wheel chock assembly.

2. The wheel chock assembly of claim 1 wherein either the first ramped chock or the second ramped chock, or both ramped chocks, further comprise a profiled notch in the shape of the head of a common fastener which allows either the first chock or the second chock to be used as a tool for loosening or tightening said fastener.

3. The wheel chock assembly of claim 1 wherein either the first ramped chock or the second ramped chock, or both ramped chocks further comprise a slotted recess that enables either of said first chock or said second chock to be utilized as a bottle opener.

4. The wheel chock assembly of claim 1 wherein either the first ramped chock or the second ramped chock, or both ramped chocks, further comprise an indentation that enables either the first chock or the second chock to be utilized as a nail remover.

5. The wheel chock assembly of claim 1 wherein either the first ramped chock or the second ramped chock, or both ramped chocks, further comprise an opening that allows said first and second ramped chocks to be tethered together with a rope, flexible cable, or bungee cord.

6. The wheel chock assembly of claim 1 wherein either the first ramped chock or the second ramped chock, or both ramped chocks, further comprise at least one multi-sided opening for connection to the multi-sided head of a common fastener, such as a threaded bolt.

7. The wheel chock assembly of claim 1 wherein either the first ramped chock or the second ramped chock, or both ramped chocks, further comprise a surface area that allows either the first ramped chock or the second ramped chock to be utilized as a hammer.

8. The wheel chock assembly of claim 6 wherein either the first ramped chock or the second ramped chock, or both ramped chocks has a threaded bolt, screw, or shaft threaded through said at least one multi-sided opening with a flange or bracket attached to the end thereof so that either the first ramped chock or the second ramped chock, or both ramped chocks can be used as a jack.

9. The wheel chock assembly of claim 6 further comprising:
a spike with a clip, wherein either the first ramped chock or the second ramped chock, or both ramped chocks, further comprise another opening to receive the spike with the clip so that either the first ramped chock or the second ramped chock, or both ramped chocks are configured to be secured to a tool, said spike having a plurality of holes along its length to receive said clip.

10. The wheel chock assembly of claim 6 wherein either the first ramped chock or the second ramped chock, or both ramped chocks, further comprise another opening to receive a spike, where the spike is configured to receive a threaded fastener in a telescoping relationship such that the relative position of the spike with respect to the fastener is configured to be adjusted to allow for specific placement of either the first ramped chock or the second ramped chock, or both ramped chocks underneath a vehicle.

11. The wheel chock assembly of claim 6 wherein either the first ramped chock or the second ramped chock has a threaded bolt, screw, or shaft threaded through said at least one multi-sided opening with a handle or grip attached to the end thereof enabling said first chock or said second chock to be used as a pickaxe or scraper.

12. The wheel chock assembly of claim 1 wherein either the first ramped chock or the second ramped chock, or both ramped chocks, are configured to be secured to a board so that the wheel chock assembly is configured to provide extra traction for a stuck or slipping vehicle wheel.

\* \* \* \* \*